INVENTORS
Friedrich BIEDERMANN  Richard WICK

INVENTORS
Friedrich BIEDERMANN  Richard WICK
BY
Michael S. Striker
Attorney

United States Patent Office 3,034,400
Patented May 15, 1962

3,034,400
PHOTOGRAPHIC PROJECTION PRINTING
APPARATUS
Friedrich Biedermann, Unterhaching, near Munich, and Richard Wick, Munich, Germany, assignors to Agfa Aktiengesellschaft, Leverkusen-Bayerwerk, Germany
Filed Sept. 30, 1957, Ser. No. 687,143
Claims priority, application Germany Sept. 29, 1956
11 Claims. (Cl. 88—24)

The present invention refers to photographic printing apparatus, and more specifically to that type thereof in which the image from a transparency is projected upon a piece of light-sensitive material.

In connection with the present invention it is irrelevant whether the print obtained is enlarged or reduced as reproduction of the transparency or is of the same size as the original transparency.

It is one main object of this invention to provide for an apparatus of the type set forth comprising means for influencing the contrast to be obtained on the sensitive material when the image from the original transparency is projected upon it.

It is another object of this invention to provide an apparatus of the type set forth in which the contrast range existing in the original transparency is automatically detected and the means for influencing the contrast of the light-sensitive material is automatically adjusted depending upon the contrast range detected in the original transparency.

It is still another object of this invention to provide an apparatus of the type set forth also with timing devices which automatically and predeterminedly control the exposure time used in producing a print. In this manner the whole operation of the photographic projection printing apparatus becomes fully automatic and practically independent upon the human factor otherwise relied upon in carrying out photo printing.

With the above objects in view, a photographic projection printing apparatus according to the invention comprises, in combination, means for projecting an image of an original transparency upon a light-sensitive material and means for influencing the contrast of said light-sensitive material. Moreover, the apparatus comprises detector means for automatically determining the contrast range of said original transparency, and adjusting means controlled by the detector means for automatically adjusting said means for influencing the contrast of the light-sensitve material in accordance with the contrast range of the original transparency as determined by the detector means.

In one embodiment of this invention the printing apparatus comprises a scanning device similar to those used in television equipment, which serves to scan the original transparency for determining the contrast range thereon, whereafter the detector means control and adjust the other devices which are used for influencing the contrast of the light-sensitive material. Preferably, the last-mentioned device is controlled by a motor the operation of which in turn is controlled by said detector means.

The detector device may comprise, in addition to the scanning device, a photo-electric cell with appropriate circuits which will serve to furnish variable potentials used for the above-mentioned controls. It is of great advantage to equip the apparatus as described so far with timer means for predetermining the time of exposure depending upon the operation of the remaining parts of the apparatus. Preferably the above-mentioned photo-electric cell may be used also for controlling at least one of the timing means.

In a preferred embodiment of the invention a semi-transparent mirror is arranged in the path of the light rays coming from a main light source in such a manner that rays from the main light source after passing the original transparency pass through the mirror toward the light-sensitive material, but are partly reflected toward the detector means. On the other hand an auxiliary source of light is used for exposing the light-sensitive material independently of the image projection, this auxiliary source of light being controlled by the above-mentioned detector means in accordance with the contrast range determined in the original transparency. In this manner the auxiliary source mainly constitutes the means for influencing the contrast in the light-sensitive material. Preferably the above-mentioned semi-transparent mirror is so arranged that the rays of light coming from the auxiliary source of light are reflected by said mirror in the direction toward said light-sensitive material, while part of the rays from the auxiliary source of light pass through the mirror toward the scanning device and the above-mentioned photo-electric cell. In this manner the above-mentioned timing device for the principal source of light can be controlled by the same photo-electric cell which is part of the detector device.

It can be seen that the apparatus according to the invention makes it possible to render the procedure of printing completely automatic so that the operator has no burden of selecting different types of light-sensitive materials according to their grade with respect to the reproduction of contrast, nor has the operator to decide on the proper exposure time, and in any case any decision based more or less on guesswork is eliminated. Therefore the apparatus according to the invention contributes greatly to the greater efficiency of printing operations.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
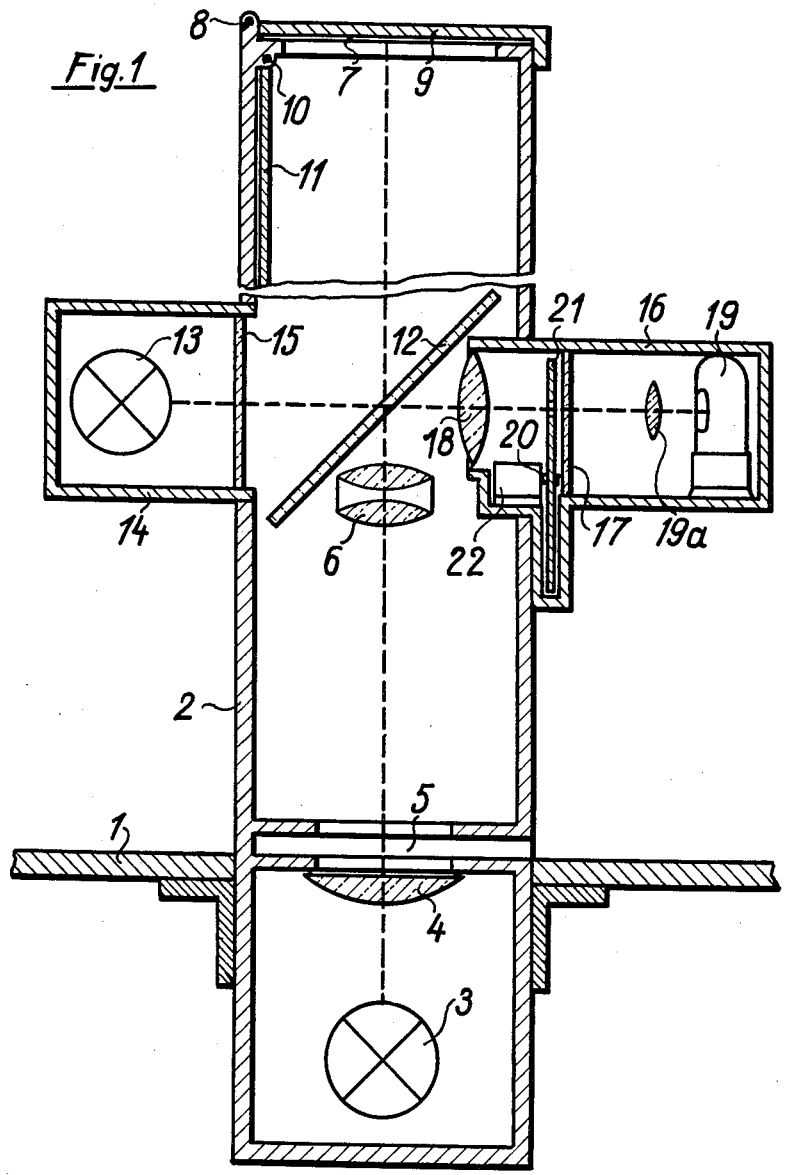
FIG. 1 is a diagrammatic longitudinal section in elevation, of an embodiment of the invention.

The embodiment illustrated by FIG. 1 is assumed to be mounted in upright position which means that the base plate 1 is substantially horizontal. A housing 2 is mounted on the base plate 1 and partly inserted into the latter. Arranged in the housing 2 are all the essential elements of the printing apparatus, mainly a main light source 3, a condenser lens 4, a holder for the original transparency 5, the projection objective 6, and the holding means for the photo-sensitive printing paper, the material preferably being furnished as a roll of substantial diameter which may be arranged parallel with the end surface at 7 so that the required strip of material may be rolled off the stock roll and placed in the holding device 7 underneath a pressure plate 9 which is turnable about pivot 8. Underneath the holding means 7 is a flap or cover 11, turnable about pivot pins, 10 in this case parallel with the pivot 8, so that this cover flap 11 may be tilted in upward direction for covering the sensitive material held at 7 against exposure.

Between the objective 6 and the holding device 7 for the light-sensitive material a semi-transparent mirror 12 is arranged under an angle. The mirror 12 permits, as indicated in FIG. 1, the light coming from the main source 3 to pass through the original transparency 5 and in straight direction to the sensitive material held at 7. In addition, one surface of the mirror 12 reflects the same light carrying the image of the transparency, to the right, as seen in FIG. 1, into a detector device described further below. There is however in addition an auxiliary source of light 13 mounted in an extension 14. The light from this auxiliary source passes a diffusing disc 15 to the mirror 12 whereby it is reflected towards the light-sensitive material in the holder 7. Additionally, part of the light rays coming from the auxiliary source 13 pass through the mirror 12 and enter the detector device. It will be explained below that the auxiliary light source 13 is the means for influencing the contrast of the light-sensitive material.

Substantially opposite to the extension 14, another extension 16 is connected with the main housing 2. The extension 16 houses the essential part of the detecting means. There is mounted across the extension 16 a light-transmissive picture receiving screen 17 upon which the image of the original transparency is projected in clear focus by the rays passing the objective 6, the mirror 12 and an additional lens 18. Behind the screen 17 is arranged a light receiving device 19, preferably a photomultiplier tube or secondary emission photocell. This light receiving means or photocell constitutes an essential part of the detector and adjusting means. On the photo cathode the above-mentioned image produced on the screen 17 is reproduced by means of the lens 19a. Immediately in front of the screen 17 a conventional perforated picture scanning disc 21 is mounted so as to rotate about an axle 20 and to be continuously driven by an electro-motor 22.

Under certain conditions it is possible to eliminate the screen 17. In this case preferably the scanning disc 21 must be positioned in the focal plane of the optical systems 6, 18, i.e. in the plane which otherwise is occupied by the screen 17.

Figure 2:
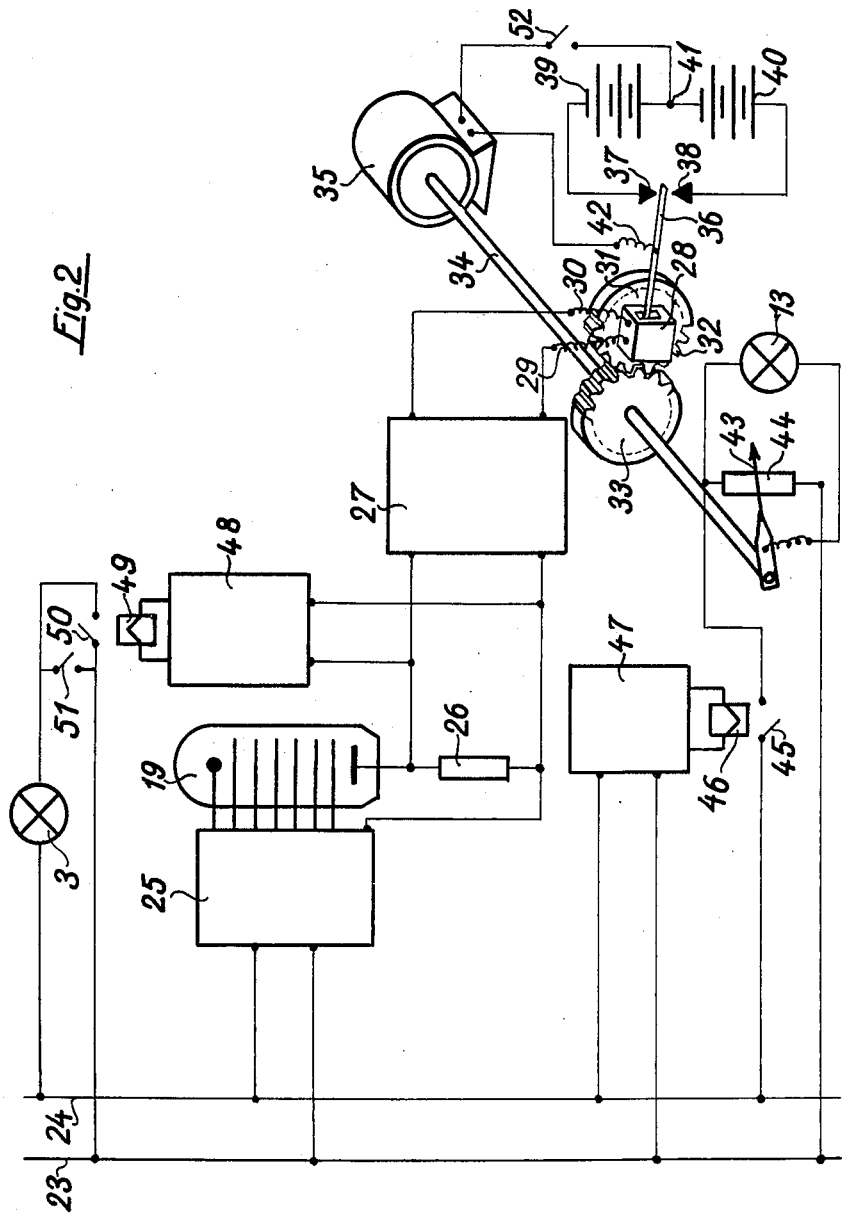
FIG. 2 is a partly diagrammatic perspective illustration of part of the control and adjusting mechanism of the device shown in FIG. 1, and otherwise a wiring diagram illustrating the electrical equipment of the apparatus.

The electrical equipment required for completing the above-described basic structure according to the invention may be provided in different ways. FIG. 2 illustrates one embodiment of this part of the device according to the invention. The numerals 23 and 24 indicate the lines of a regular A.C. power supply. A conventional power supply unit 25 is connected to the lines 23, 24 and operates a photomultiplier tube 19. A resistor 26 is placed in circuit with the anode of the tube 19 and a logarithmic amplifier 27 is connected in parallel with the resistor 26 so that this amplifier 27 is influenced in a well known manner by the A.C. component of the photo current passing the resistor 26. Operatively connected to the amplifier 27 is a control arrangement which serves for controlling and adjusting the auxiliary source of light 13.

Part of the control device is a galvanometer 28 which is connected to the exit terminals of the amplifier 27 by means of flexible leads 29, 30 and is mounted on a disc 31 which is turnable about the center thereof. The disc 31 is provided with a series of circumferential teeth 32 which mesh with a sprocket 33 mounted on the shaft 34 of an electro motor 35. The indicating hand 36 of the volt meter 28 is itself conductive and projects between two stationary contacts 37, 38, spaced only a small distance apart from each other and connected to a voltage divider 39, 40. The center tap 41 of the latter is connected with one terminal of the motor 35, while the other terminal of the motor is connected by a flexible lead 42 to the conductive hand or indicator of the galvanometer.

The outer end of the motor shaft 34 carries the sliding contact 43 of a potentiometer 44 located in the circuit of the auxiliary source of light 13. The switch 45 in this circuit of the auxiliary light source 13 is controlled by a relay 46, in turn actuated by an electronic timing device 47.

The diagram shows a second timing device 48 which actuates a relay 49 for operating a switch 50 located in the circuit of the main light source 3. There is a regular switch 51 for manual operation in parallel with switch 50. In this particular embodiment the operation of the timing device 48 relies also on the photo tube 19 and therefore the device 48 is connected in parallel with the resistance 26. The device 48 is influenced by the D.C. component of the photo current passing through the resistor 26 in a manner which is known in the art, namely by the potential of a condenser in the timing device, the potential of this condenser changing in accordance with the D.C. component existing across the resistor 26.

The operation of the apparatus illustrated by FIGS. 1 and 2 is as follows: After the cover flap 11 has been moved into its upper position to protect sensitive material placed into the holder 7 the switches 51 and 52, preferably united in one double pole switch, are closed whereby the main light source 3 is switched on and the motor 35 is placed into a condition of readiness for operation. The original transparency located in the holder 5 is projected through the objective 6 and the additional lens 18 upon the screen 17 and the image created on this screen is then scanned by the very rapidly rotating scanning disc 21. This means that the individual point elements of the projected picture or image are reproduced on the photo cathode of the photomultiplier tube 19 in very rapid succession. The scanning can be carried out along parallel lines or along a spiral path and is repeated continuously on account of the continuous rotation of the disc 21. Of course, other devices known in the field of television may be used for scanning the image. By the use of comparatively large picture elements or scanning spots or by using a special electrical circuit (threshold value limitation) erroneous indication of the detector means can be avoided, as for instance those that might be caused by scratches in a transparency, or other disturbing spots having particularly high transparency.

In the photomultiplier tube 19 a photo current is generated the strength of which is proportional to the transparency of the individual spots of the image that has been scanned. Therefore, if the original transparency contains areas which have different density or blackness then a periodic A.C. potential is created across the resistor 26, the amplitude whereof corresponds to the differences in transparency of the negative or positive original at 5, while the period or cycle of this A.C. potential corresponds to the time required for one scanning operation.

On account of the above, at the exit terminals of the logarithmic amplifier 27 connected in parallel with the resistor 26 an A.C. potential is obtained the magnitude of which is identical with the logarithmic values of the differences in transparencies of the positive or negative original, i.e. the differences in density thereof, or in other words this A.C. potential is an indication for the contrast range existing in the original transparency as determined by the detector means just described.

Now the thus mentioned A.C. potential is used for acting on the potentiometer 44 controlling the auxiliary source of light 13. This is done by means of the control device comprising the motor 35. Preferably the galvanometer 28 is connected to the amplifier 27 through a rectifier not shown in the diagram. Now since the pointer 36 of the galvanometer 28 tends to make an angular movement in accordance with the magnitude of the A.C. potential existing at the exit terminals of the amplifier but in doing so necessarily abuts against one of the two stationary contacts 37 or 38, a circuit for the motor 35 is closed the moment the pointer 36 makes contact with one of the two stationary contacts 37 or 38. As soon as the circuit for the motor 35 is closed the shaft 34 starts to turn which causes the sliding contact 43 of the potentiometer 44 to change its position. At the same time the gear 33 causes the disc 31 to turn which changes the position of the whole galvanometer 28 in a direction which is opposite to the direction in which the pointer 36 has moved on account of the rectified potential from its normal position. The turning of the disc 31 continues until the galvanometer 28 is turned through that degree which corresponds to the angular movement of the pointer 36 of the galvanometer 28 which the latter would have carried out had the pointer 36 not been stopped by contacting one of the stationary contacts 37 or 38. As soon as the galvanometer 28 has been turned into that last-mentioned position, the pointer 36 disengages itself from the particular stationary contact whereby the circuit for the motor 35 is interrupted and the sliding contacts 43 remains in the position relative to the potentiometer 44 into which it has been moved by the turning of shaft 34.

In this manner the action of the auxiliary source 13 is predetermined in accordance with the contrast range determined by the detector means as described above. The setting of the potentiometer 44 predetermines the intensity of light furnished by the auxiliary source of light 13.

Now the switches 51 and 52 may be opened and the covering flap 11 moved back into its inoperative position as shown in FIG. 1. The timing device 48 for the main light source 3 and the electronic timing device 47 for the auxiliary light source 13 may be switched on by means not shown in the drawing. Consequently the light-sensitive material at 7 will be exposed simultaneously by light coming from the main source 3 and light coming from the auxiliary source 13, the additional amount of light coming from the axuiliary source 13 being adjusted in such a manner that the contrast of the said light-sensitive material is influenced in accordance with the contrast range of the original transparency.

As for the duration of exposure, the auxiliary source of light 13 is switched off by the timing device 47 after a predetermined interval, which usually is a constant amount of time. However, the main light source 3 is switched off by the timer 48 as soon as the sum of the quantities of light coming from the main light source 3 and from the auxiliary source of light 13 have reached a predetermined value. This value is controlled and indicated by the photomultiplier tube 19 because of the light from both said sources of light is trannsmitted to this tube 19 through the mirror 12 and partly by reflection at the surface of the mirror 12, as explained above.

Useful modifications of the described embodiments may consist in the following: The device may be equipped with a relay arrangement whereby the switches 51, 52 are automatically opened as soon as the adjustment of the potentiometer 44 is completed. Likewise the timing devices 47 and 48 may be switched on by means of a delayed action or timed switching arrangement which is put into operation already when the switches 51 and 52 are closed for starting the first-mentioned operation. Also the cover flap 11 may be operated by electromagnetic or electromechanical means.

A further modification of the apparatus consists in replacing the potentiometer adjustment for the intensity of the light coming from the auxiliary source 13, by a set of blinds or filters arranged across the path of the rays coming from the source 13 and travelling toward the mirror 12. In this case the motor shaft 34 would carry mechanical means for moving and controlling such blinds or filters instead of carrying the movable contact 43.

As a further alternative, the entire quantity of light coming from 13 and being radiated upon the light-sensitive material may be adjusted by changing the time of exposure instead of adjusting the intensity of the source of light. In this case the motor shaft 34 would have to be coupled with a control element forming part of the time setting means in the timing device 47.

In the above-described embodiment one photomultiplier tube 19 has been used both for the detector operation and for controlling the timing device 48. Evidently, it is quite as well possible to use a separate photo tube for the control of the timing device. Moreover, the mechanical adjusting means including the motor 35 and pertaining parts could be replaced by a series of thyratron tubes connected in a circuit with the amplifier 27, and a plurality of relays respectively associated with the thyratrons, plus a plurality of resistors respectively associated with and controlled by said relays. If the resistors are arranged in the circuit of the auxiliary source of light 13 and if the different thyratrons ignite at different grid potentials furnished from the amplifier 27, then evidently the intensity of light of the auxiliary source 13 will be adjusted in accordance with the resistors activated by the thyratrons in accordance to the contrast range determined by the detector means.

Figure 3:
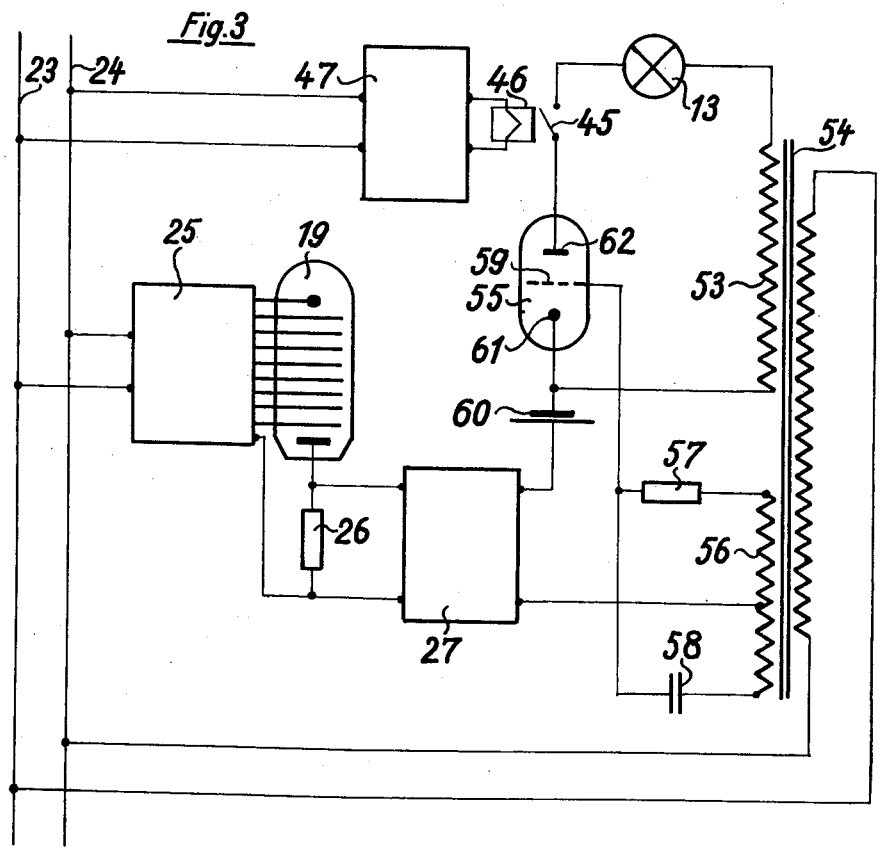
FIG. 3 is an electrical wiring diagram referring to a modified embodimtnt of the invention.

FIG. 3 illustrates still another embodiment of the electrical equipment forming part of the apparatus. The diagram of FIG. 3 applies also to the means shown by FIG. 1. As far as similar or identical elements are used in FIG. 3 as compared with FIG. 2, the same numerals are being applied. It can be seen from FIG. 3 that one secondary coil 53 of a transformer 54 is connected with a thyratron 55 the anode circuit whereof contains the auxiliary source of light 13 and a switch 45 actuated by the relay 46 which in turn is operated by the timing device 47. Another secondary coil 56 of the transformer 54 is connected to a phase shifter circuit comprising a resistor 57 and a condenser 58, which circuit is connected to the grid 59 of the tube 55.

The detector device is the same as in FIG. 2 and ends with the amplifier 27. A rectifier, not shown in the diagram, is connected with positive terminals to the center tap of the secondary coil 56 of the transformer 54 while the negative exit terminal of the amplifier 27 is connected through a source of direct current 60 with the cathode 61 of the tube 55.

Figure 4:
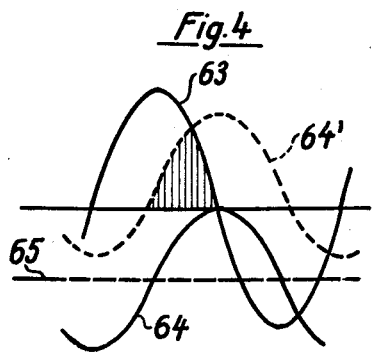
FIG. 4 is a diagram illustrating the electrical characteristics of the embodiment illustrated by FIG. 3.

The resistor 57 and the condenser 58 are so dimensioned, as is known in the art, that the potential of the grid 59 is displaced in phase by 90° with respect to the potential of the anode 62. The diagram of FIG. 4 illustrates the variation of the anode potential with respect to the cathode as is indicated by the sine curve 63 while the variation of the grid potential is indicated by the curve 64. The line 65 indicates the potential of the D.C. source 60. This potential is so high that at the start of the operation of this arrangement the upper tips of the grid potential curve 64 do not exceed or surmount the igniting potential of the thyratron 55. The igniting potential of the tubes preferably used in this embodiment corresponds approximately to the cathode potential.

Therefore the tube 55 is practically without any current when the device is started since at this moment no potential is existent at the exit terminals of the amplifier.

When however the image is being scanned as described above, a potential is generated at the amplifier exit terminals corresponding to the contrast range of the original transparency. By these varying potentials at the exit of the amplifier the grid potential will be moved more or less up into positive values as is indicated by way of example by the dotted curve 65'. To the extent to which the grid potential is being influenced in this manner, the grid potential is positive with respect to the cathode during larger or smaller portions of the individual periods so that during these portions the tube 55 and therefore the auxiliary source of light 13 carry a current as long as the anode potential is positive. Whenever the variation of the anode potential passes through zero the flow of current through the tube 55 and therefore also through the lamp or source 13 is interrupted. This sequence of events repeats within every single cycle. The portions of the cycle during which the tube 55 would carry a current is shown by shading in the diagram of FIG. 4.

By varying the grid D.C. potential the current carrying capacity of the tube 55 can be adjusted continuously within a phase angle of 180°. Since the grid D.C. potential is influenced by the potential existing at the amplifier exit terminals the mean intensity of the auxiliary source of light is automatically regulated within the above-mentioned large range in accordance with the contrast range of the original transparency.

It should be noted that the last-described embodiment of the invention yields the substantial advantage, that the scanning of the image and the regulation or adjustment of the auxiliary source of light can be carried out not before but simultaneously with the actual exposure of the light-sensitive material for the purpose of printing.

It should be noted further that the arrangement according to FIG. 3 is equally well usable in connection with an apparatus in which the detector means and the timing device 48 for the main source of light have each their own photo cell and in which the scanning device obtains only the light coming from the main light source through the original transparency, and also in a printing apparatus exactly according to FIG. 1 in which case a photomultiplier tube 19 serves both purposes. In the latter case the diagram according to FIG. 3 would have to be modified in such a way that in the manner shown in FIG. 2 an additional timing device would have to be connected in parallel with the resistor 26. Also, in this case the additional light coming from the auxiliary source of light 13 arrives on the screen surface 17 but does not contribute to the potential obtained at the exit terminals of the amplifier 27 because this light is uniformly distributed and has therefore no variations.

There is still another modification of the invention, differing from the arrangement illustrated by FIGS. 2 and 3, and consisting mainly in the use of feedback by which the dynode potentials of the photomultiplier tube 19 are at all times so adjusted that always the same photomultiplier anode current flows through the system. Since the sensitivity of a photomultiplier tube depends upon the actual dynode potentials in logarithmic relation, the said dynode potentials constitute a direct measure for the density of the original transparency and therefore these potentials can be transmitted to the volt meter 28 in FIG. 2 or to the thyratron circuit of FIG. 3. In this case a logarithmic amplifier 27 can be dispensed with.

It will be understood that each of the elements described above, or two or more together, may also find a useful application in other types of photographic printing apparatus differing from the types described above.

While the invention has been illustrated and described as embodied in photographic projection printing apparatus, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Photographic printing apparatus comprising, in combination, support means for supporting a transparency and for supporting light-sensitive material on which a photographic print of said transparency is to be produced; main light means carried by said support means for directing printing light through said transparency carried by said support means to said light-sensitive material; exposure control means operatively connected with said main light means for limiting automatically the exposure of said material to printing light; additional light means carried by said support means for directing additional light to said light-sensitive material without passing through said transparency so as to decrease the contrast provided on said light-sensitive material by exposing the latter to additional light; timer means cooperating with said additional light means for terminating automatically the exposure of said light-sensitive material to said additional light; detector means responsive to light from said main light means directed through said transparency for detecting the contrast range of said transparency; and adjusting means cooperating with said additional light means for adjusting the exposure derived therefrom, said adjusting means being operatively connected with said detector means to be automatically controlled thereby for adjusting the exposure derived from said additional light according to the contrast range of said transparency.

2. Photographic printing apparatus comprising, in combination, support means for supporting a transparency and for supporting light-sensitive material on which a photographic print of said transparency is to be produced; main light means carried by said support means for directing printing light through said transparency carried by said support means to said light-sensitive material; exposure control means operatively connected with said main light means for limiting automatically the exposure of said material to printing light; additional light means carried by said support means for directing additional light to said light-sensitive material without passing through said transparency so as to decrease the contrast provided on said light-sensitive material by exposing the latter to additional light; timer means cooperating with said additional light means for terminating automatically the exposure of said light-sensitive material to said additional light; detector means carried by said support means and responsive to light from said main light means directed through said transparency for automatically determining the contrast range of said transparency appearing in the flux of light from said main light means which has passed through said transparency, said detector means including a scanning device located in the path of said flux of light for scanning the image carried thereby, a light receiver means arranged in the path of said flux coming from said transparency through said scanning device for producing an electric output signal whose amplitude corresponds with the contrast range existing between elemental areas of said scanned image, and a logarithmic amplifier operatively connected with said light receiver; and adjusting means cooperating with said additional light means for adjusting the exposure derived therefrom, said adjusting means being operatively connected with said detector means to be automatically controlled thereby for adjusting the exposure derived from said additional light according to the contrast range of said transparency.

3. A photographic printing apparatus as recited in claim 2 and wherein said amplifier is connected to said light receiver means for furnishing a variable potential depending upon said contrast range, said adjusting means including electrical moving means operatively connected with said detector means so as to be controlled by the variable potential furnished by said detector means, and movable control means operated by said electrical moving means for automatically adjusting the influence of said additional light means.

4. Apparatus as recited in claim 3, said movable control means including means for regulating the intensity of light radiated by said additional light means upon said light-sensitive material.

5. Apparatus as recited in claim 3 and wherein said movable control means includes means for determining the time during which said light-sensitive material is exposed to light from said additional light means.

6. Photographic printing apparatus comprising, in combination, support means for supporting a transparency and for supporting light-sensitive material on which a photographic print of said transparency is to be produced; main light means carried by said support means for directing printing light through said transparency carried by said support means to said light-sensitive material; exposure control means operatively connected with said main light means for limiting automatically the exposure of said material to printing light; additional light means carried by said support means for directing additional light to said light-sensitive material without passing through said transparency so as to decrease the contrast provided on said light-sensitive material by exposing the latter to additional light; timer means cooperating with said additional light means for terminating automatically the exposure of said light-sensitive material to said additional light; detector means carried by said support means and responsive to light from said main light means directed through said transparency for automatically determining the contrast range of said transparency appearing in the flux of light from said main light means which has passed through said transparency, said detector means including a scanning device located in the path of said flux of light for scanning the image carried thereby, a photoelectric cell means arranged in the path of said flux coming from said transparency through said scanning device for producing an electric output signal whose amplitude corresponds with the contrast range existing between elemental areas of said scanned image, and a logarithmic amplifier operatively connected with said photoelectric cell means; and adjusting means cooperating with said additional light means for adjusting the exposure derived therefrom, said adjusting means being operatively connected with said detector means to be automatically controlled thereby for adjusting the exposure derived from said additional light according to the contrast range of said transparency.

7. Photographic printing apparatus comprising, in combination, support means for supporting a transparency and for supporting light-sensitive material on which a photographic print of the transparency is to be produced; main light means carried by said support means for directing printing light through said transparency carried by said support means to said light-sensitive material; exposure control means operatively connected with said main light means for limiting automatically the exposure of said material to printing light; additional light means carried by said support means for directing additional light to said light-sensitive material without passing through said transparency so as to decrease the contrast provided on said light-sensitive material by exposing the latter to additional light; timer means cooperating with said additional light means for terminating automatically the exposure of said light-sensitive material to said additional light; detector means including photoelectric cell means responsive to light from said additional light means and to light from said main light means passed through the transparency for detecting the contrast range of said transparency; adjusting means cooperating with said additional light means for adjusting the exposure derived therefrom, said adjusting means being operatively connected with said detector means to be automatically controlled thereby for adjusting the exposure derived from said additional light according to the contrast range of said transparency; said photoelectric cell means being located in the path of the flux of light both from said main light means and from said additional light means and operatively connected with and common to said exposure control means and said detector means for controlling said exposure control means depending upon the amount of light reaching said cell means from both said light means, and for controlling said detector means depending upon the contrast range of said transparency; and a resistor arranged in the circuit of said photoelectric cell means, said exposure control means being connected in parallel with said resistor.

8. Photographic printing apparatus comprising, in combination, support means for supporting a transparency and for supporting light-sensitive material on which a photographic print of said transparency is to be produced; main light means carried by said support means for directing printing light through said transparency carried by said support means to said light-sensitive material; exposure control means operatively connected with said main light means for limiting automatically the exposure of said material to printing light; additional light means carried by said support means for directing additional light to said light-sensitive material without passing through said transparency so as to decrease the contrast provided on said light-sensitive material by exposing the latter to additional light; timer means cooperating with said additional light means for terminating automatically the exposure of said light-sensitive material to said additional light; detector means carried by said support means and responsive to light from said main light means directed through said transparency for automatically determining the contrast range of said transparency appearing in the flux of light from said main light means which has passed through said transparency, said detector means including a scanning device located in the path of said flux of light for scanning the image carried thereby, a photoelectric cell means arranged in the path of said flux coming from said transparency through said scanning device for producing an electric output signal whose amplitude corresponds with the contrast range existing between elemental areas of said scanned image, and a logarithmic amplifier operatively connected with said photoelectric cell means; adjusting means cooperating with said additional light means for adjusting the exposure derived therefrom, said adjusting means being operatively connected with said detector means to be automatically controlled thereby for adjusting the exposure derived from said additional light according to the contrast range of said transparency.

9. A photographic apparatus as recited in claim 8 and wherein said adjusting means includes an A.C. circuit for said additional light means containing a triode and means for furnishing to the anode and grid, respectively, of said triode A.C. potentials displaced in phase with respect to each other, and means controlled by variable potential furnished by said detector means for setting up a D.C. potential between the cathode and grid of said triode corresponding to the contrast range of said transparency and influencing the power supplied to said additional light means.

10. A photographic printing apparatus comprising, in combination, main light means for directing printing light through a transparency to light-sensitive material; additional light means for directing additional light to said light-sensitive material without passing through said transparency so as to decrease the contrast obtained on said light-sensitive material by exposing the latter to said additional light; detector means cooperating with said transparency for automatically determining the contrast range thereof appearing in the flux of light which has passed through said transparency, said detector means including a scanning device located in the path of said flux of light for scanning the image carried thereby, a photo multiplier tube having a plurality of electrodes, a control loop circuit connected with said photomultipler tube for furnishing an amount of control energy depending upon said contrast range, and means cooperating with said scanning device for projecting said printing light through said transparency to said scanning device and said photomultipler tube; and adjusting means cooperating with said additional light means for automatically adjusting the exposure derived from said additional light, said adjusting means being operatively connected to said detector means to be controlled by said control energy for adjusting said additional light according to the contrast range of said transparency.

11. A photographic printing apparatus for producing from an original transparency photographic prints on light-sensitive material, comprising, in combination, a main light source means arranged for passing printing light through said transparency onto said light-sensitive material; an auxiliary means arranged for directing additional light onto said light-sensitive material without passing through said transparency, for thereby decreasing the contrast obtained on said light-sensitive material by exposing the material to said additional light; detector means automatically determining the contrast range of said transparency appearing in a flux of light after the latter has passed through said transparency, said detector means including a scanning device located in the path of said flux of light for scanning the image carried thereby, electrical means operating said scanning device, a photoelectric cell means and an amplifier connected thereto furnishing a variable potential according to the contrast range, and means projecting said printing light through said transparency to said scanning device and photoelectric cell means; and adjusting means operatively connected with said detector means for controlling the light intensity of said additional light, according to the contrast range of a particular transparency.

References Cited in the file of this patent

UNITED STATES PATENTS

| | | |
|---|---|---|
| 2,269,161 | Morse | June 6, 1942 |
| 2,352,914 | Rackett | July 4, 1944 |
| 2,794,366 | Canaday | June 4, 1957 |
| 2,847,903 | Modney | Aug. 19, 1958 |
| 2,853,921 | Biedermann et al. | Sept. 30, 1958 |